United States Patent [19]

Cha

[11] Patent Number: 5,246,554

[45] Date of Patent: Sep. 21, 1993

[54] PROCESS FOR SELECTED GAS OXIDE REMOVAL BY RADIOFREQUENCY CATALYSTS

[76] Inventor: Chang Y. Cha, 3807 Reynolds St., Laramie, Wyo. 82070

[21] Appl. No.: 670,842

[22] Filed: Mar. 18, 1991

[51] Int. Cl.$^5$ ............................................. B01D 53/00
[52] U.S. Cl. ............................. 204/157.3; 204/158.2; 204/157.43; 204/157.6
[58] Field of Search .................. 588/247; 204/157.3, 204/157.15, 157.43, 157.46, 157.49

[56] References Cited

U.S. PATENT DOCUMENTS

| | | | |
|---|---|---|---|
| 3,502,427 | 3/1970 | Johswich | 23/2 |
| 3,565,777 | 2/1971 | Lauer | 204/157.1 |
| 3,656,441 | 4/1972 | Grey et al. | 110/8.2 |
| 3,765,153 | 10/1973 | Grey | 55/118 |
| 3,869,362 | 3/1975 | Machi et al. | 204/157.1 R |
| 3,887,683 | 6/1975 | Abe et al. | 423/235 |
| 3,960,682 | 6/1976 | Baranova et al. | 204/157.11 X |
| 3,981,815 | 9/1976 | Taniguchi et al. | 252/182 |
| 3,983,021 | 9/1976 | Henis | 423/212 |
| 3,997,415 | 12/1976 | Machi et al. | 204/157.1 H |
| 4,004,995 | 1/1977 | Machi et al. | 204/157.1 H |
| 4,076,606 | 2/1978 | Suzuki et al. | 204/157.1 R |
| 4,076,607 | 2/1978 | Zavitsanos et al. | 204/157.43 |
| 4,175,016 | 11/1979 | Lewis et al. | 204/157.1 H |
| 4,671,952 | 6/1987 | Masse | 204/157.49 |
| 4,940,405 | 7/1990 | Kelly | 431/1 |

OTHER PUBLICATIONS

Kirk-Othmer, Encyclopedia of Chemical Technology, 3rd Ed. vol. 15, 494–517, (Microwave Technology).
E. Wall et al, "Retorting Oil Shale by Microwave Power", Advances in Chemistry, vol. 183, 329–341, 1979.

Primary Examiner—John Niebling
Assistant Examiner—Cybille Delacroix-Muirheid
Attorney, Agent, or Firm—John O. Mingle

[57] ABSTRACT

This process to remove gas oxides from flue gas utilizes adsorption on a char bed subsequently followed by radiofrequency catalysis enhancing such removal through selected reactions. Common gas oxides include $SO_2$ and $NO_x$.

2 Claims, 1 Drawing Sheet

PROCESS FOR SELECTED GAS OXIDE REMOVAL BY RADIOFREQUENCY CATALYSTS

This invention was made with Government support under DE-FG03-90ER80898 awarded by the Department of Energy. The Government has certain rights in this invention.

BACKGROUND OF INVENTION

1. Field of Invention

The present invention relates to a process using electromagnetic energy in the radiofrequency region to catalyze selective chemical reactions that remove sulfur and nitrogen oxides from flue gas.

2. Background

Coal is a major energy resource of the United States and must be utilized in increased amounts if energy independence is to be a viable goal. A major problem associated with coal combustion is the resulting emissions of sulfur dioxide ($SO_2$) and nitrogen oxides ($NO_x$) into the atmosphere. Current flue gas removal technologies are not only expensive and cumbersome, but also produce troublesome waste products. High volumes of chemicals currently are required for $SO_2$ removal while $NO_x$ removal often uses expensive platinum catalysts. High conversions remain a difficult goal for these current technologies for the convenient chemical reactions require high activation energies, and thus, high temperatures.

Quantum radiofrequency (RF) physics is based upon the phenomenon of resonant interaction with matter of electromagnetic radiation in the microwave and RF regions, since every atom or molecule can absorb, and thus radiate, electromagnetic waves of various wavelengths. The detection of the radiated spectrum to determine the energy levels of the specific atoms or molecules is called radiofrequency spectroscopy. Often the so called "fine lines" are of interest, and these are created by the rotational and vibrational modes of the electrons. For instance, refer to L. Stepin, *Quantum Radio Frequency Physics*, MIT Press, 1965.

In the subject invention, the inverse is of interest, that is the absorption of microwave and RF wavelengths by the energy bands of the atoms or molecules resulting in a heating of the nonplasma material and the excitation of valence electrons. This lowers the activation energy required for desirable chemical reactions. In this sense, RF energy can be thought of as a form of catalysis when applied to chemical reaction rates. For instance, refer to Kirk-Othmer, *Encyclopedia of Chemical Technology*, 3rd Edition, Volume 15, pages 494–517, Microwave Technology.

The electromagnetic frequency spectrum can be conveniently divided into ultrasonic, microwave, and optical regions. The microwave region runs from 300 Mhz (megahertz) to 300 Ghz (gigahertz) and encompasses frequencies used for much communication equipment. For instance, refer to N. Cook, *Microwave Principles and Systems*, Prentice-Hall, 1986. A narrow part of this microwave region, 915 to 5000 Mhz, is commonly employed for selective heating purposes. Microwave ovens are a common household item and operate normally using 2450 MHz, which is a good frequency for exciting water molecules. However, this type of microwave heating often goes by the common name "RF Heating" and is actually a misnomer for most actual radiofrequencies lie in the what is now called the ultrasonic region. Yet, this concept of using the symbol RF to indicate a catalytic heating action for chemical reactions, regardless of the actual frequencies employed, continues to be commonly found.

Much energy related research was performed in the decade of the 1970s, and a number of U.S. patents were issued. These include:

| No. | Inventor | Year |
|---|---|---|
| 3,502,427 | Johswich | 1970 |
| 3,565,777 | Lauer | 1971 |
| 3,656,441 | Grey-1 | 1972 |
| 3,765,153 | Grey-2 | 1973 |
| 3,869,362 | Machi-1 | 1975 |
| 3,887,683 | Abe | 1975 |
| 3,960,682 | Baranova | 1976 |
| 3,981,815 | Taniguchi | 1976 |
| 3,997,415 | Machi-2 | 1976 |
| 4,004,995 | Machi-3 | 1977 |
| 4,076,606 | Suzuki | 1978 |
| 4,175,016 | Lewis | 1979 |
| 4,940,405 | Kelley | 1990 |

Referring to the above list, Johswich discloses an acid treated activated carbon, giving a higher porosity, for use in removing sulfur, sulfur oxides and nitrogen oxides from flue gases. Lauer discloses a process to decompose sulfur dioxide by first electrically charging water used for absorption and then exposing to an ultraviolet light catalyst to enhance sulfur formation. Grey-1 discloses a cyclone wall-film wash for flue gas components that is enhanced by an electrostatic corona discharge. Grey-2 discloses equipment for an electrostatic ionizing process within a cyclone system that removes flue gas components. Machi-1 discloses a process for removing $SO_2$ and $NO_x$ by employing ionizing radiation or ultraviolet light at specific compositions to enhance their decomposition. Abe discloses a process for the removal of nitrogen oxides by injecting ammonia and absorbing on activated charcoal with a vanadium oxide catalyst. Baranova discloses a process for handling waste gas containing sulphurous-acid anhydride using an inorganic manganese salt as catalyst. Taniguchi discloses a process for removing sulfur dioxide and nitrogen dioxides by using ionizing radiation to form a removable aerosol. Machi-2 discloses an improvement over Machi-1 by employing contaminated air as part of the process. Machi-3 discloses an improvement over Machi-1 by employing high dose rate electron beam irradiation. Suzuki discloses a process for decomposing nitrogen dioxide using microwave irradiation. Lewis discloses a radiolytic-chemical process for gas production employing nitrogen oxides to inhibit secondary reactions.

In a later patent Kelley discloses a two stage furnace pulsed combustor where the first combustor forms soot that is employed to reduce $SO_2$ and $NO_x$ in the second combustor where calcium is added to react with the sulfur.

Some additional comment is needed concerning Suzuki which uses the standard microwave frequency to decompose $NO_x$ in the presence of typical exhaust gas constituents, such as $SO_2$, $CO_2$ and others. Additionally Suzuki works with only homogenous decomposition of $NO_x$ where the microwave energy catalyzes the breakdown of $N_2$ and 2NO allowing other subsequent reactions to occur. Suzuki provides no information on heterogenous reactions.

Microwave heating was employed in other activities. For instance, Wall et.al. retorted shale oil with a standard microwave source in "Retorting Oil Shale by Microwave Power," 183 Advances in Chemistry Series 329, American Chemical Society, 1979.

The present invention removes $NO_x$ and $SO_2$ from gas stream but employs pyrolytic carbon or char in conjunction with RF microwave heating to catalyze a series of heterogeneous reactions that allow removal of said constituents. The above prior art, although representing interesting background material, employs significantly different concepts.

SUMMARY OF INVENTION

The objectives of the present invention include overcoming the above-mentioned deficiencies in the prior art and providing a potentially economically viable process for the removal of $NO_x$ and $SO_2$ from stack gases and further recover usable byproducts.

The subject invention utilizes radiofrequency catalysis to enhance desirable chemical reactions between carbon and $NO_x$ and $SO_2$ resulting in their elemental breakdown. A two step process is employed whereby step one adsorbs the subject gases onto pyrolytic carbon and step two employs RF catalysis to decompose them.

DETAILED DESCRIPTION OF INVENTION

Figure 1:
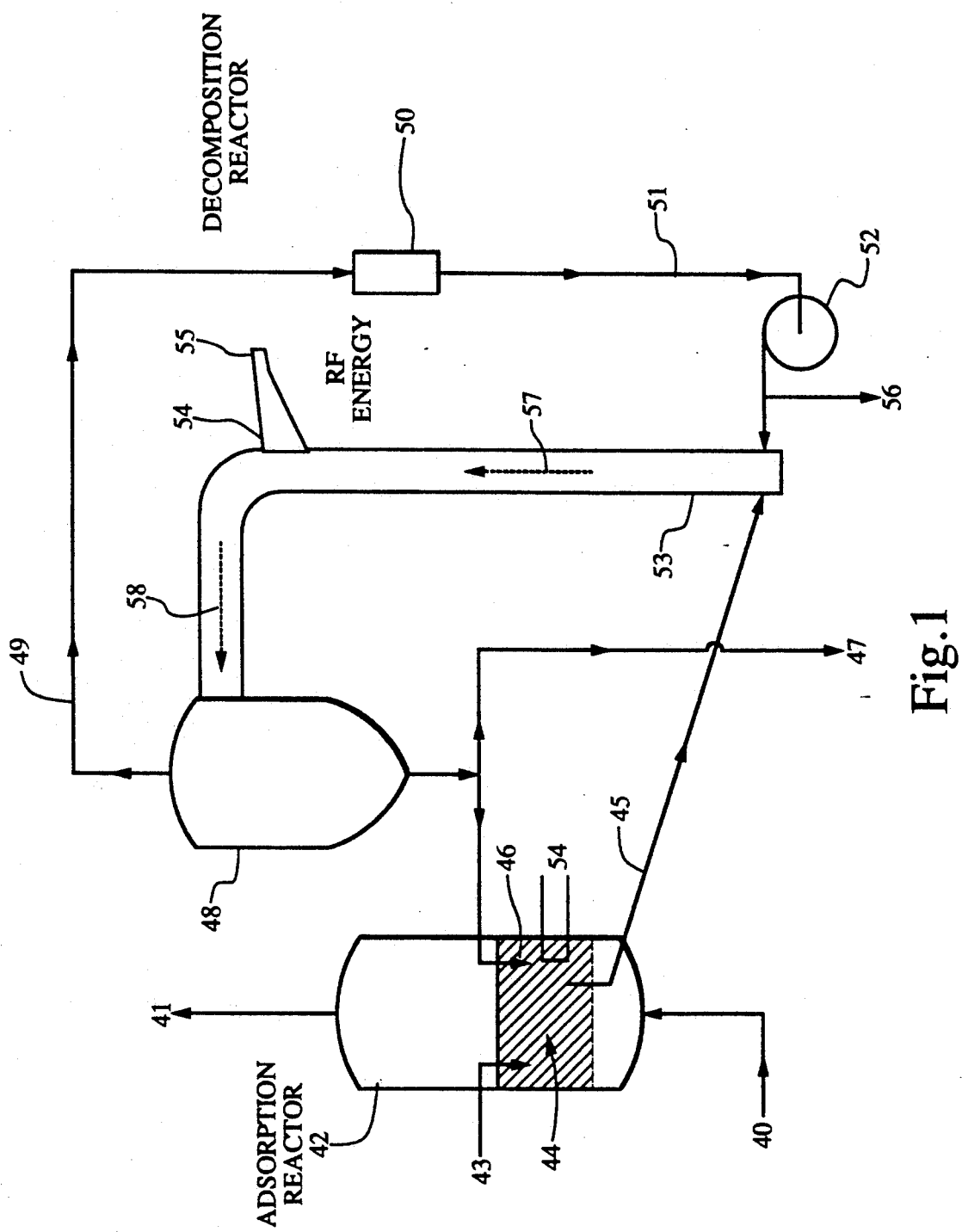
FIG. 1 shows the flow diagram for RF catalyzed flue gas cleanup.

Radiofrequency heating is a versatile form of energy that is applicable to enhance rates of chemical reactions. Particularly reactions that proceed by free-radical mechanisms are often catalyzed to higher rates because their initial equilibrium thermodynamics is unfavorable. A second class of catalyzed reactions are those whose reaction kinetics appear unfavorable at desirable temperature conditions.

Pyrolytic carbon is an excellent RF energy absorber. Further, it has good properties for the reduction of $NO_x$ and $SO_2$. When char, which contains a high percentage of carbon as shown in Table 1, is placed in a RF microwave field, its temperature rapidly increase setting up a large temperature gradient between the surface of the char and its surrounding bulk gas phase. If this gas phase comprises oxygen-containing molecules, the carbon will react and capture these oxygen atoms. Because the RF energy has heated the char surface, it asks as a catalyst for these heterogenous reactions to proceed with a relatively low bulk gas temperature of below approximately 300° F.

Flue gases containing $NO_x$ and $SO_2$ contact the RF energized carbon from char, carbon black, or other elemental carbon containing substance, the following chemical reactions potentially proceed:

$$C + 2NO \xrightarrow{(RF)} CO_2 + N_2; \quad (1)$$

$$C + NO \xrightarrow{(RF)} CO + \tfrac{1}{2}N_2; \quad (2)$$

$$C + SO_2 \xrightarrow{(RF)} CO_2 + S; \quad (3)$$

$$2C + SO_2 \xrightarrow{(RF)} 2CO + S; \quad (4)$$

where ——(RF)→ implies that RF microwave energy catalyzes the reaction to proceed in the direction indicated.

TABLE 1

| Elemental Composition of Char | |
|---|---|
| Component | Weight % |
| Carbon | 77.1 |
| Hydrogen | 2.3 |
| Nitrogen | 1.2 |
| Sulfur | 0.4 |
| Oxygen | 10.1 |
| Ash | 8.9 |

TABLE 2

| Composition of Gas Produced from Char | |
|---|---|
| Component | volume % |
| $H_2$ | 39.27 |
| CO | 53.59 |
| $CH_4$ | 3.67 |
| $CO_2$ | 3.48 |

Reactions (1) and (3) are exothermic and are favored at low temperatures. Reactions (2) and (4) are endothermic and naturally occur at only at elevated temperatures. Further, reaction (1) has a much higher heat of reaction than does reaction (3); therefore, NO can be decomposed selectively by close control over the pyrolytic carbon-bed temperature.

As noted in reactions (3) and (4), sulfur is the reaction product and not sulfuric acid. Yet, because of the oxygen and water in the flue gas, the actual reaction mechanism is more likely:

$$SO_2 + \tfrac{1}{2}O_2 + H_2O \rightarrow H_2SO_4(\text{sorbed}); \quad (5)$$

$$2C + H_2SO_4 \xrightarrow{(RF)} S + CO + CO_2 + H_2O; \quad (6)$$

where 'sorbed' implies that the reaction occurs on the surface of the particle char as the initial $SO_2$ is likely adsorbed on the pyrolytic carbon and the formed $H_2SO_4$ remains on the surface and within the char particles. In reaction (6) the temperature-dependent equilibrium between the reaction products containing oxygen will vary the actual amounts of each that could be potentially detected especially in a flow system.

As shown in Table 1, the char contains a number of constituents beside carbon, and the RF microwave energy does decompose it. Typical components are:

$$\text{Char} \xrightarrow{(RF)} H_2 + CO + C + \text{Ash}; \quad (7)$$

where this occurs even at the low bulk gas temperatures. The nitrogen is not included herein since it often is employed as a sweep gas for such a reaction. Table 2 gives a typical gas analysis obtained by heating char with RF energy, and shows that some product carbon and hydrogen combine to form methane.

In a practical sense, the char is present much in excess and is largely recycled after the adsorbed components, such as sulfur, are stripped off by high temperature, approximately 900° F., and recovered separately; this largely leaves product activated carbon to reclaim.

FIG. 1 shows the flow sheet of a system practicing the subject invention. Char 43 enters the adsorption reactor 42 that operates as a fluidized bed 44 where the flue gas 40 acts as the fluidizing gas and also contains $SO_2$ and $NO_x$ that is adsorbed on the fluidized char 43. Any source of pyrolytic carbon containing a large surface area, such as carbon black, could be employed in place of the char. The cleaned flue gas 41 with the $SO_2$ and $NO_x$ removed leaves the adsorption reactor 42. Depending upon the actual design, some removal of potentially entrained char dust may be necessary. An adequate cooling apparatus 54 is employed to keep the fluidized bed temperature to generally below about 300° F.

The char containing the adsorbed $SO_2$ and $NO_x$ 45 leaves the adsorption reactor 42 and enters the decomposition reactor 53 where a recycled gas 49 powered by a blower 52 provides a medium moving the char in the form of an entrained-bed reactor. The char passes upward through the reactor where it is heated by radiofrequency energy 55 through an appropriate wave guide 54 where the RF energy is reflected down the reactor chamber and heats the up-flowing char 57. In the presence of the reactive pyrolytic carbon, this RF energy 55 catalyzes the reduction of $SO_2$ and $NO_x$ as well as decomposes the char. Since the system is recycled, only a small part of the total needs to react in any cycle. The residence time of the char generally governs the reaction rates. The extra gas 56 generated is bled off the recycle gas stream 49. The post RF treated char 58 enters a separator 48, such as a cyclone, where the char 46 is recycled back to the adsorption reactor 42 and the separated gas 49 recycles through a cooler 50 and enters 51 the blower 52. Some of the char 47 from the separator 48 is bled-off to be further processed. Sulfur and activated carbon are potential products recovered from this bled-off char 47.

EXAMPLE 1

To check out the performance of the subject invention in carrying out reactions (1)–(7) a laboratory system was employed. A RF energy source at the standard microwave frequency of 2450 MHz and reasonable power was used with a special wave guide constructed to surround the reaction tube of ¼ to ⅜ I.D. Vycor, a material that was essentially transparent to microwave energy. RF connection were made through mitre plates that allow needed access.

Load impedance matching can be employed if desired, and was often used with laboratory systems since the reaction chamber was physically small. However, in most industrial applications the reaction chamber and wave guides will be large and reflected microwaves became eventually absorbed by the moving bed of char; thus, load impedance matching becomes unnecessary.

Table 1 gives a typical composition of char obtained from mild gasification of subbituminous Western coal. Char from other sources would expect to have a somewhat different composition, but behave in the subject invention in a similar expected manner. Applying RF energy to the char alone at approximately 400° F. using a nitrogen carrier gas produced a gas composition as shown in Table 2.

The sulfur ends up adsorbed on the char and was not released at this reaction temperature. The char can absorb from approximately 5.9 to 10.1 weight percent $SO_2$ depending upon whether it was RF pre-treated. In an actual operating reactor using recycled char, some pretreatment likely occurs, but untreated char normally was added as makeup. This adsorption was usually adequate to keep nearly all the $SO_2$ on the surface of the char to then take part in chemical reactions (3) and (4).

Adsorption of NO was not as great as $SO_2$, but what actual form the $NO_x$ might be, was unknown. Usually the large driving force in temperature between the char surface and nitrogen oxides in the bulk stream was sufficient to cause chemical reactions (1) and (2) to proceed, especially since the char was much in excess.

EXAMPLE 2

To investigate chemical reaction (1) 10 gram pyrolytic carbon black was inserted into the reaction tube and a gas containing 550 ppm NO and 99.95% $N_2$ was introduced into the top of the reactor. When the RF field was energized to approximately 350 watts, measurements of the NO level reduced to essentially zero. When the RF field was turned off, the measurements quickly returned to the previous input concentration.

A similar test was performed with a inlet composition of 1500 ppm $SO_2$ and 99.85% $N_2$. The reaction kinetics for this chemical reaction (3) were not as fast, indicating a longer needed reaction residence time, yet the $SO_2$ concentration was lowered to approximately 100 ppm. In practice this longer residence time was obtained because of the better ease of adsorption of $SO_2$ on the char. A further test using variable RF wattage showed that the maximum reaction conditions for these tests appeared at approximately 550 watts.

EXAMPLE 3

The subject invention applied to a larger system would produce excellent results. Data from approximately a small sized power plant is shown in Table 3. Besides the previous steps as shown in FIG. 1 for the subject invention, pretreatment and char feed is desirable as well as recovery of the sulfur and activated charcoal.

Table 3 also shows the composition of the clean stack gases as they leave the adsorption reaction, while Table 4 gives the gas composition leaving the decomposition reactor.

TABLE 3

| | Processed Typical Flue Gas | |
|---|---|---|
| Component | Inlet Stack Gas Vol % | Outlet (Clean) Stack Gas Vol % |
| $N_2$ | 68.10 | 68.70 |
| $CO_2$ | 8.20 | 8.27 |
| $H_2O$ | 17.52 | 17.34 |
| $O_2$ | 5.80 | 5.69 |
| $SO_2$ | 0.33 | 0 |
| $NO_x$ | 0.05 | 0 |
| Total | 100.00 | 100.00 |

TABLE 4

| | Produced Gas from Decomposition Reactor | |
|---|---|---|
| | Volume % | |
| Component | Wet Basis | Dry Basis |
| $CO_2$ | 59.54 | 95.43 |
| $N_2$ | 2.85 | 4.57 |
| $H_2O$ | 37.61 | — |
| Total | 100.00 | 100.00 |

The following material composition occurs with the decomposition reactor:

| | | wt % | | wt % |
|---|---|---|---|---|
| IN: | Saturated char: | 95.5 | OUT: Recycle char: | 86.9 |
| | Recycle gas: | 4.5 | Gas: | 9.7 |
| | | | Char to S-Reactor | 3.4 |

In this decomposition reactor some of the char is decomposed according to chemical reaction (7) adding to the gas material balance. The S-reactor, or sulfur producing reactor, recovers the products from the process in the mass proportion of about 56% sulfur and 44% activated charcoal. This S-reactor operates at greater than 90° F. in order to strip the sulfur away in gaseous form from the residual activated carbon and allow its later condensation. The char that passes to S-reactor is made up by additional feed char to the adsorption reactor.

In an actual production facility, many steps would be taken to recovery residual heat from the various processes. Further, the hot gases from the char decomposition can be used for an additional energy source.

The foregoing description of the specific embodiments will so fully reveal the general nature of the invention that other can, by applying current knowledge, readily modify and/or adapt for various applications such specific embodiments without departing from the generic concept, and therefore such adaptations or modifications are intended to be comprehended within the meaning and range of equivalents of the disclosed embodiments. It is to be understood that the phraseology or terminology herein is for the purpose of description and not of limitation.

I claim:

1. A process for gas oxide removal comprising:
   using a char bed;
   adsorbing said gas oxide on said char while maintaining a temperature below about 300° F.;
   removing said gas oxide from said char by applying radiofrequency energy selected from the frequency range of 915 to 5000 MHz; and
   recycling said char.

2. The process according claim 1 wherein said gas oxide further comprises being selected from $SO_2$, $NO_x$, and combinations thereof.

* * * * *